UNITED STATES PATENT OFFICE.

ROBERT H. COONS, OF MARION COUNTY, MISSOURI.

REMEDY FOR HOG-CHOLERA.

SPECIFICATION forming part of Letters Patent No. 302,986, dated August 5, 1884.

Application filed March 6, 1884. (No specimens.)

*To all whom it may concern:*

Be it known that I, ROBERT H. COONS, a citizen of the United States, residing in the county of Marion and State of Missouri, have invented a new and useful composition of matter to be used for the treatment and also as a preventive of the disease commonly known as "cholera" among both hogs and chickens, and called "hog-cholera" and "chicken-cholera," respectively, of which the following is a specification.

My composition consists of the following ingredients, combined in the proportions stated, viz: hyposulphite of soda, thirty per cent.; bicarbonate of soda, thirty per cent.; copperas, (sulphate of iron,) fifteen per cent.; ginger, (*Zingiber,*) eight per cent.; mandrake-root, (*Podophyllum,*) eight per cent.; lime, six per cent.; Cayenne pepper, (*Capsicum,*) three per cent; total, one hundred per cent. These ingredients are to be thoroughly mixed and ground together while dry, or ground separately while dry and then thoroughly mixed, and kept in well-closed cans or canisters perfectly dry and free from exposure to air.

In using the above-named composition the following directions should be followed, to wit:

First. For hog-cholera, give one large table-spoonful of the composition mixed in water, then thoroughly mixed with slop, to each hog diseased twice a day. If the hog will not eat slops, then mix the composition with shelled corn boiled, or with potatoes and a little milk. Use no dry food, (especially corn.) Either boil or soak all food till soft. Keep the sick hogs to themselves. As soon as hogs begin to improve, give the remedy once a day for a few days; then once every three days. Keep a little of the remedy mixed with plenty of salt and strong ashes in a sheltered trough, where hogs have easy access to it at all times. While sick, give new bedding every three days or oftener, burning the old.

Second. As a preventive of hog-cholera, give one large table-spoonful of composition in soaked or cooked food twice a week or oftener, according to danger, paying due regard to salt, ashes, and remedy in the accessible trough, giving new bedding every week, burning old. The can should be well closed and kept in a dry place.

Third. For chicken-cholera, give to one dozen hens, twice a day, a mixture made of one table-spoonful of the above composition and one tea-spoonful of Cayenne pepper well mixed with water, and the whole then reduced to a moderate consistence with ground feed, (shorts or meal.) Keep a trough of water or of milk having one table-spoonful of this composition to one-half gallon of water or milk where the chickens have access to it at all times. Keep the sick chickens to themselves.

Fourth. As a preventive of chicken-cholera, continue the use of the remedy in the water or the milk in the trough, as above set forth, but do not use the composition so freely. Keep the chicken-house clean, warm, and well ventilated, with open windows both above and below the roosts, so that all noxious gases and effluvia may readily pass out. If the house is damp, scatter lime about the floor. If the combs pale, the heads droop, or there are any signs of diarrhea among the chickens, then use the remedy freely.

By the use of the above-named composition, hogs affected with or having what is commonly known as "cholera" or "hog-cholera" may be improved; and by the use of said composition cholera among hogs, or hog-cholera, may be prevented; and, also, by the use of said composition, chickens affected with or having what is known as "cholera" or "chicken-cholera" may be improved; and by the use of said composition cholera among chickens, or chicken-cholera, may be prevented.

I am not aware that all the ingredients of my said composition in the proportions stated have been used together, or a patent therefor granted to any person.

What I claim, and desire to secure by Letters Patent of the United States, is—

The herein-described composition of matter to be used in the treatment and prevention of cholera in hogs and chickens, and in the treatment of hog-cholera and chicken-cholera, said composition consisting of hyposulphite of soda, bicarbonate of soda, copperas, (sulphate of iron,) ginger, (*Zingiber,*) mandrake, (*Podophyllum,*) lime, (*Calcis,*) and Cayenne pepper, (*Capsicum,*) in the proportions specified.

ROBERT H. COONS.

Witnesses:
FRANK W. LANE,
ENOCH A. McLEOD.